(12) United States Patent
Poblete

(10) Patent No.: US 10,371,194 B2
(45) Date of Patent: Aug. 6, 2019

(54) 3-IN-1 ATTACHMENT SYSTEM FOR LINER PLATES OF MILLS USED TO GRIND MINERALS

(71) Applicant: AMERICAN SCREW DE CHILE LIMITADA, Santiago (CL)

(72) Inventor: G. Mario Poblete, Santiago (CL)

(73) Assignee: American Screw de Chile Limitada, Santiago (CL)

( * ) Notice: Subject to any disclaimer, the term of this patent is extended or adjusted under 35 U.S.C. 154(b) by 294 days.

(21) Appl. No.: 15/103,988

(22) PCT Filed: Dec. 4, 2014

(86) PCT No.: PCT/CL2014/000069
§ 371 (c)(1),
(2) Date: Jun. 30, 2016

(87) PCT Pub. No.: WO2015/085444
PCT Pub. Date: Jun. 18, 2015

(65) Prior Publication Data
US 2016/0305467 A1 Oct. 20, 2016

(30) Foreign Application Priority Data
Dec. 13, 2013 (CL) .................................. 3582-2013

(51) Int. Cl.
| F16B 43/00 | (2006.01) |
| B02C 17/22 | (2006.01) |
| F16B 33/00 | (2006.01) |
| F16B 39/12 | (2006.01) |

(52) U.S. Cl.
CPC ............ *F16B 43/001* (2013.01); *B02C 17/22* (2013.01); *F16B 33/004* (2013.01); *F16B 39/12* (2013.01)

(58) Field of Classification Search
USPC .................................................. 411/533, 542
See application file for complete search history.

(56) References Cited

U.S. PATENT DOCUMENTS

| 2,761,349 | A |   | 9/1956 | Heller |
| 2,943,661 | A | * | 7/1960 | Stern ....................... F16B 5/128 |
|           |   |   |        |        277/640 |
| 3,331,272 | A | * | 7/1967 | Hanneman ............... F16B 37/00 |
|           |   |   |        |        411/187 |
| 3,422,721 | A |   | 1/1969 | Yonkers |

(Continued)

FOREIGN PATENT DOCUMENTS

| CA | 1120966 | 3/1982 |
| CL | 3069-2008 | 10/2008 |

(Continued)

*Primary Examiner* — Gary W Estremsky
(74) *Attorney, Agent, or Firm* — Ladas & Parry LLP

(57) ABSTRACT

The present invention consists in a 3-in-1 fastening system for shells of mill liners used for grinding minerals allowing the quick installation and removal in one step by using conventional tools. The system comprises a metal washer (1), a fastening element (2, 200) and a rubber washer (5), being concentrically joined to be coupled and thereby securing the shell of a mill, wherein the metal washer (1) has one or more inner openings (3) receiving one or more retaining members (4) to retain the fastening element (2, 200) inside said metal washer (1).

13 Claims, 4 Drawing Sheets

(56) References Cited

U.S. PATENT DOCUMENTS

| | | | | |
|---|---|---|---|---|
| 3,550,498 | A * | 12/1970 | Briles | F16B 33/004 411/432 |
| 3,606,357 | A * | 9/1971 | Yonkers | F16B 43/001 277/637 |
| 3,670,618 | A * | 6/1972 | Jellison | F16B 43/001 277/637 |
| 4,583,575 | A | 4/1986 | Lundmark | |
| 5,393,182 | A * | 2/1995 | Berecz | F16B 33/004 411/369 |
| 5,618,145 | A * | 4/1997 | Kuo | F16B 21/186 411/368 |
| 5,649,798 | A * | 7/1997 | Ito | F16B 35/041 411/369 |
| 5,662,444 | A * | 9/1997 | Schmidt, Jr. | F16B 41/002 411/353 |
| 5,902,084 | A * | 5/1999 | Garcia | B27B 5/32 411/428 |
| 5,987,837 | A * | 11/1999 | Nelson | E04D 3/3606 411/286 |
| 7,581,913 | B2 * | 9/2009 | Ordonio, Jr. | F16B 37/14 411/369 |
| 7,818,862 | B2 * | 10/2010 | Arany-Kovacs | F16B 37/00 29/402.03 |

FOREIGN PATENT DOCUMENTS

| | | |
|---|---|---|
| CL | 2011000182 | 4/2011 |
| EP | 1 255 051 A1 | 11/2002 |

* cited by examiner

3-IN-1 ATTACHMENT SYSTEM FOR LINER PLATES OF MILLS USED TO GRIND MINERALS

RELATED APPLICATION INFORMATION

This application is a 371 of International Application PCT/CL2014/000069 filed 4 Dec. 2014, which claims priority from Chilean Application No.: 3582-2013 filed 13 Dec. 2013, the content of which is incorporated herein by reference.

SPECIFICATION

The present invention relates to a fastening system for quick removal of shells and mill liners used in the mining industry for grinding minerals.

BACKGROUND OF THE INVENTION

The internal shells of Autogenous or Semi-Autogenous (SAG) mills used in the mining industry for grinding minerals are fixed to the mantle of the mill by means of bolts which are mainly introduced from the inside of this to pass the mantle of the mill by a perforation. Since the tip of the bolt is outside the mill, it engages a rubber washer, a steel washer and a nut. This operation is usually performed by several operators which use pneumatic tools to remove nuts and washers separately; this involves many hours in performing these three processes considering the size of this type of mills and the large number of fixing elements available. The washers used for fixing the shells of such mills correspond to cup-type washers which are formed by a hollow metal section that accommodates a rubber washer whose function is to make a seal that prevents runoff of fluids from the inside the mill. An example of this type of fastening systems is that disclosed by Patent CA1120966.

Such washers are fixed at the surface of the mill by means of a lock nut so as to provide tight adjustment and capable of withstanding vibrations without rotating, which many time makes it difficult the removal the nut, and then of the washer for replacement of shells.

In many cases, operators must hit the fixing elements to release them and in extreme cases, cutting the nuts with oxy-cutting processes. Additionally, the rubber washers usually remain attached to the locking bolt which implies additional effort on the part of operators to extract these elements often making use of specialized tools not for it.

In the state of the art there are solutions that have tried to solve the problem of extracting nuts and washers of mill shells. An example of this is disclosed by the Patent Application CL 3069-2008 that proposes a quick release nut for fasteners of mill shells, without unscrewing it. To this end a nut with notches in the periphery and orthogonal to the flat faces is provided, that allow concentrate stresses when a wedge between themselves is provided. Thus, a crack is created and finally the faces are separated to allow advancement of the crack to rupture and complete separation of the parts.

Although this solution provides a mechanism for quick removal of the nut, it is a complex process and it does not suggest a mechanism for the specific extraction of washers used in this type of fixings as explained above.

Similarly, the Patent Application CL 1886-2011 discloses a nut to be extracted quickly from the fastening bolts of mill lining, plates, which consists of a hollow hexagonal outer body and an inner cylindrical body constituted by a bushing divided with internal thread. For loosening of the nut a pneumatic or hydraulic tool is used to eject the outer hexagonal body; then, the inner cylindrical body which is threaded onto the bolt is struck with a smaller tool such as a hammer, so that to open the two split halves, with the nut and bolts becoming released.

Again, the solution provided does not suggest a mechanism for extracting the washers used in this type of fastener, which as in the previous case requires the use of additional tools and complex processes for the extraction of the nut.

Furthermore, the utility model application No CL 182-201 discloses an adjustment washer for a fastening system of mills engaged in treating ores known in the market under the name "Elingol". This adjustment washer mainly consists of a forged steel washer with a drag supportive device which is affixed a metal ear and a hot vulcanized rubber washer adhered to the previous one. The washer is conventionally installed on the bolt to finally tighten the assembly. The removal of the fastening system is made using an impact wrench provided with a die having on its periphery a device that takes the washer and rotates together with the nut outwards.

While this invention allows the extraction of the fastening system faster than conventional systems, it must be done with a specialized tool configured to engage both the nut and the washer. This represents an increase in maintenance costs. In addition, this patent does not mention the insertion mechanism of the washer and nut on the holding bolt which, given the features of the invention, suggests that this process must be done in different steps and with different tools.

Another drawback associated with the inventions mentioned is that the components of the fastening system of shells, namely nut and washer, are provided separately, which may hinder their management and represent a risk when working with them in height, e.g. on scaffolding.

Therefore, after noting the drawbacks observed in the devices related to the present invention and forming part of the state of the art, an object of the present invention is to provide a comprehensive quick removal fastening system for shells and liners of mills, i.e. consisting of a 3 in 1 system, allowing insertion and removal in one step and using a single conventional tool; this speeds up the process of insertion and removal of the fastening systems associated with the maintenance of mills, also increasing the safety of the process.

Another object of the present invention is to provide a fastening system that prevents its unauthorized disassembly for unauthorized repairs, thereby avoiding misuse and possible associated damage.

DESCRIPTION OF THE INVENTION

The present invention relates to a fastening system for quick removal of shells and mill liners used in the mining industry for grinding of minerals, mainly consisting of a metal cup-washer, with a concentric rubber washer vulcanized in the inside, which is attached to a fastener by a retaining element forming a system 3-in-1 system, so that when said holding member is displaced by the torque applied to it, it drags the washers.

In a first embodiment of the invention, the fastening element corresponds to a nut which opening is concentric to the metal washer, to receive a bolt of the type used for fastening shells in mills for grinding ore. Meanwhile, the upper inner portion of the washer is configured with an aligned opening to receive the retaining element, which is capable of retaining the nut especially configured to be inserted into said washer so that both elements are kept together axially but loose radially both in the insertion and extraction operation of the fastening system of the present invention.

The installation operation of the fastening system according to the embodiment described above is carried out by first introducing the opening of the metal washer with the rubber washer inside into the bolt tip. Once the washer is properly positioned and pressing is exerted for the assembly being inserted until the thread of the bolt comes into contact with the inner thread of the nut, the nut is rotated with a conventional tool so that it moves axially through the bolt and simultaneously pushes the washer by contact. Once the metal washer gets in touch with the surface of the mill, and the rubber washer is correctly positioned against the bolt to seal the latter and the nut achieves its maximum displacement along the bolt, the fastening system is in its correct position.

To remove the fastening system it is enough to position the conventional tool on the nut, which by going through the bolt by the torque applied by the tool, drags the washer thanks to the retaining element provided therebetween.

In a second embodiment of the invention, the fastening element corresponds to a bolt specifically designed to be embedded in the metal washer and retained by the retaining member provided between the metal washer and said bolt, so that both components are kept together axially but loose radially both in the insertion and the extraction operation of the fastening system of the present invention.

The insertion operation of the fastening system according to the embodiment described above is performed by first entering the system through the bolt by drilling the mill mantle until its thread contacts a thread in a bore of the lining inside of mill. Once the fastening system is properly positioned through the bore of the mill mantle, with a conventional tool the bolt head is rotated so that it moves through the lining thread and simultaneously pushes the washers by contact.

Once the metal washer gets in contact with the surface of the mill, leaving the rubber washer correctly positioned against the bore of the mill for its sealing and the bolt reaches its maximum displacement inside the mill bore, the fastening system is in its correct position.

Thus, the invention to be described in detail below provides a system for the simple fixing and rapid extraction in one step which may be carried out using conventional tools.

DETAILED DESCRIPTION OF THE INVENTION

Figure 1:
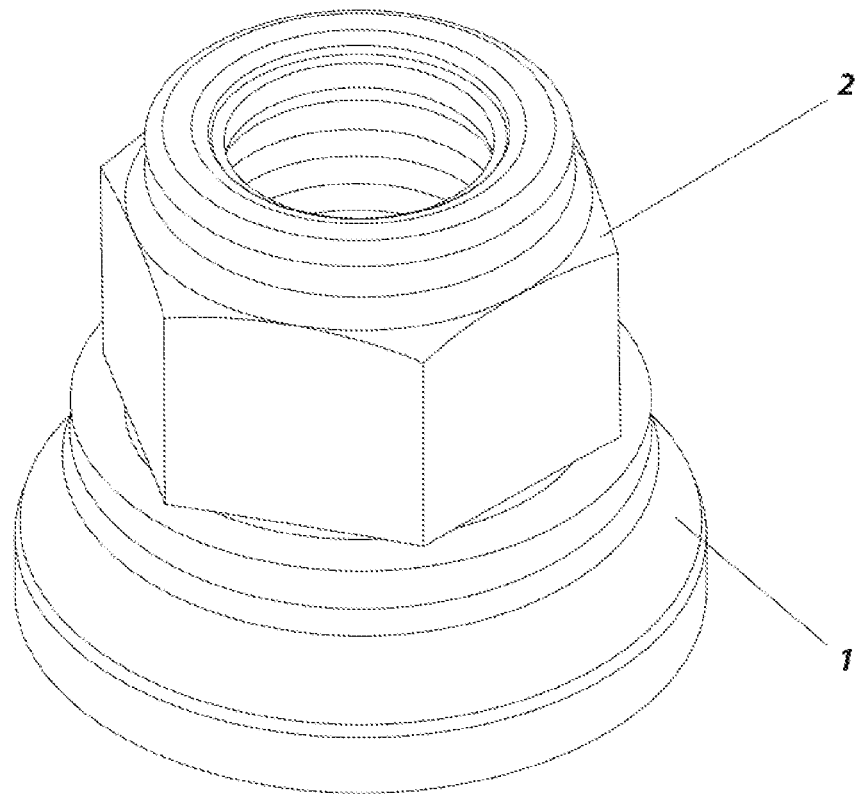
FIG. 1 shows a general view of the fastening system according to a first embodiment of the invention.

According to a first embodiment of the present invention and as illustrated in FIG. 1, a fastening system is provided for the quick installation and removal for mill shells and liners consisting of a metal washer (1) of the cup type together with a nut (2), which are concentrically joined in order to fix liners to the mantle of a mill by inserting into a bolt used for this type of fastener (not shown).

Figure 2:
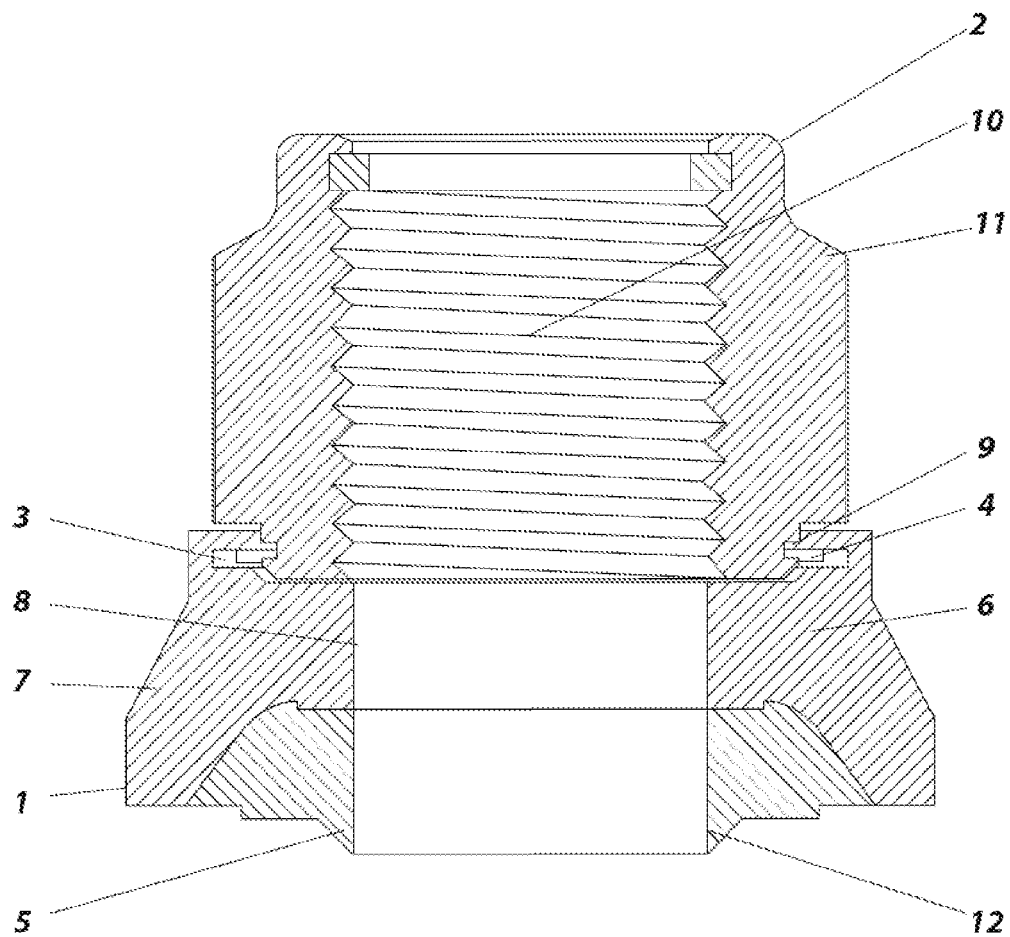
FIG. 2 shows a sectional view of the fastening system according to a first embodiment of the invention.

According to FIG. 2, the metal washer (1) has a circular truncated cone shape converging towards the center, with a core (6) and side walls (7), being vulcanized therebetween below the core, a rubber washer (3), which has a concentric central bore to the bore of the washer (8) provided in said core (6).

At the top inside the metal washer (1) portion, near the top edge, there is an inner opening (3) whose depth is at least ⅔ the thickness of the side wall (7).

In a preferred embodiment of the invention the metal washer (1) has at least two internal opposing openings (3) by which the retaining element (4) is introduced, which can be for example Seagers type bolts that are compressed during assembly to be introduced into the openings and being then expanded to its final position. Another type of retaining elements can be used such as stud-bolts or any other type of pin known in the prior art.

The nut (2) has head nut (11) and is arranged between the side walls (7) of the metal washer (1) with its bottom face resting on the upper face of the core (6). In addition, the lower portion of the nut (2) has around its perimeter an inner recess (9) engaging the retaining elements (4) when they are duly inserted in the inner openings (3) of the metal washer (1), where the depth of the inner recess (9) is preferably at least ⅓ the length of the inner openings (3). Similarly, the height of the inner openings (3), as well as the inner recess (9) is substantially greater than the height of the retaining elements (4) to allow engagement therebetween. Additionally, the internal thread (10) of the nut (2) is concentric to the washer bore (8) and the bore of the rubber washer (5) so that the entire assembly can be inserted in a bolt for shells of the mineral grinding mill.

The above configuration allows rotation of the nut (2) with respect to the washer (1) but does not allow the separation of these elements to move the assembly in the axial axis, since the walls of the inner recess (9) abut the retaining elements (4) allowing rapid insertion and removal of a bolt by turning the nut (2) which drags the washer (1) in both directions.

Figure 3:
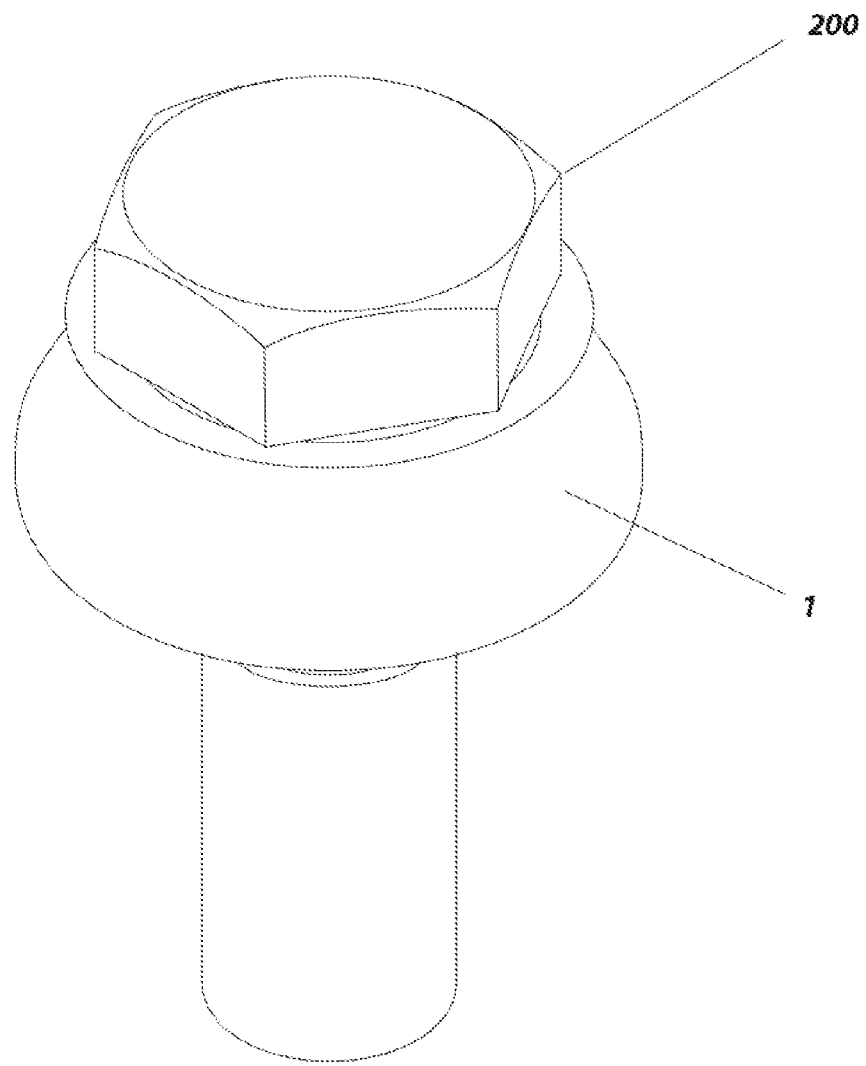
FIG. 3 shows a general view of the fastening system according to a second embodiment of the invention.

According to a second embodiment of the present invention and as illustrated in FIG. 3, there is a fastening system for the quick installation and removal of shells and mill liners consisting of the metal washer (1) described above is provided together with a bolt (200) especially designed, which are concentrically joined to anchor the liners to the mantle of a mill.

Figure 4:
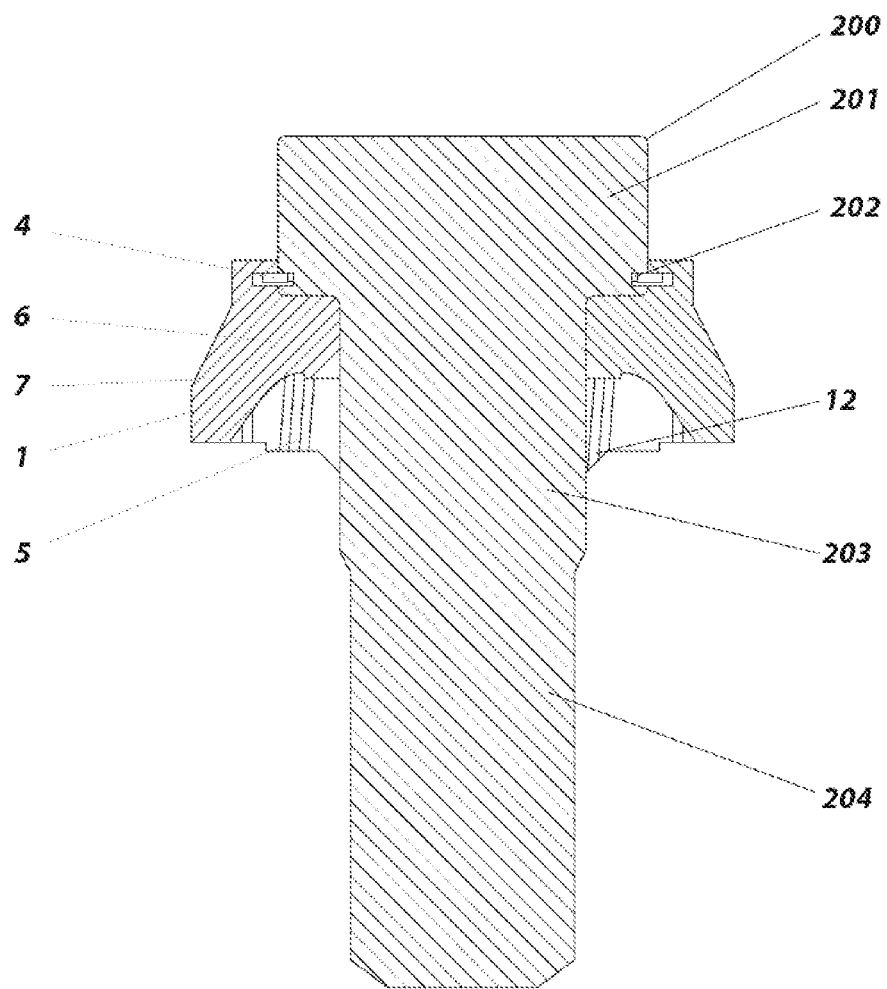
FIG. 4 shows a sectional view of the fastening system according to a second embodiment of the invention.

According to FIG. 4, the bolt (200) is configured with a bolt head (201), bolt body (202), inner recess of the bolt (203) and bolt thread (204), wherein the bolt body (202) is provided between the side walls (7) of the metal washer (1) with the underside of the bolt head (201) supporting on the upper face of the core (6). Moreover, the inner recess of the bolt (203) is located in the lower portion of the head engaging with the retaining elements (4) when these are properly inserted in the inner openings (3) of the metal washer (1), where the depth of the inner recess of the bolt (202) is preferably at least ⅓ the length of the inner openings (3). Similarly, the height of the bolt recess (202) is substantially less than the height of the retaining elements (4) to allow engagement therebetween.

The above configuration allows rotation of the bolt (200) with respect to the washer (1) but does not allow the separation of these elements when the assembly moves in the axial axis, since the walls of the inner recess of the bolt (202) abut the retaining elements (4) allowing the rapid insertion and removal of the assembly in a mill liner by turning the bolt head (201) of the bolt (200) which drags the washer (1) in both directions.

In the embodiments described above, the head (11, 201) of the fastening element acting with the tool to insert and extract the fastening system of the present invention corresponds to a conventional hex-head nut where the overall diameter of the fastening element is less than the total diameter of the washer (1). However, the present invention is not limited to one type of head and diameter of a washer, which may be of any form available in the market so that the assembly can be removed with any conventional tool known in the State of the Art.

Similarly, the rubber washer (5) is cured throughout the lower side of the washer (1), which also has a protruding section (12) converging towards the center of the washer, thus allowing the sealing of the mill surface in which the fastening system is used. However, the present invention allows the curing of various types of rubber washers with different sizes and shapes to suit the requirements of the fastening system used.

The process of assembling the fastening system according to the present invention then is to provide a cup-type metal washer (1) and curing a rubber washer (5) in its lower side with a concentric central opening to the washer bore (8). Then the fastening element (2, 200) is assembled to the top inside portion of the metal washer (1) so that the inner recess (9, 202) of said fastening element engages with the retaining elements (4) and cannot be detached from the metal washer (1).

Additionally, the characteristics of the fastening system of the present invention does not allow the disassembly of the elements, due to the configuration of the retaining element inside the openings of the washer, whereby when the fastening element has been assembled the only way to separate the elements is by destroying of the system thereby preventing unauthorized repair and misuse.

The invention claimed is:

1. A 3-in-1 fastening system for liner shells of mill used for grinding minerals allowing the quick installation and removal in one step by using conventional tools, comprising a metal washer, a fastening element and a rubber washer, being concentrically joined to be coupled and thereby securing the shell of a mill, wherein the fastening element comprises a head and an inner recess in said head, being connected to the metal washer by one or more retaining elements, wherein the metal washer is constituted by a core, side walls and washer bores and has one or more inner openings aligned to the upper portion of the metal washer, the rubber washer is vulcanized between the side walls and below the metal washer core and wherein the one or more retaining elements is arranged between the one or more inner openings of the metal washer and the inner recess in the head of the fastening element.

2. The fastening system according to claim 1, wherein the retaining element is a latch in the form of a retaining ring.

3. The fastening system according to claim 1, wherein one or more of the retaining elements is a stud bolt.

4. The fastening system according to claim 1, wherein the fastening element is a nut with internal thread, and nut head, wherein also the lower portion of the nut is arranged between the side walls of the metal washer with its bottom face resting on the upper face of the metal washer's core.

5. The fastening system according to claim 4, wherein the depth of said inner recess is at least ⅓ the length of the inner openings of the metal washer.

6. The fastening system according to claim 1, wherein the fastening element is a bolt with bolt head, bolt body, bolt thread, and wherein also the bolt body is arranged between the side walls of the metal washer with the underside of the bolt head resting on the upper face of the metal washer's core.

7. The fastening system according to claim 6, wherein the depth of the inner recess of the bolt is at least ⅓ the length of the one or more inner openings of the metal washer.

8. The fastening system according to claim 4, wherein the head of the fastening element corresponds to a lock hex head.

9. The fixation system according to claim 4, wherein the overall diameter of the fastening element is less than the total diameter of the metal washer.

10. The fastening system according to claim 9, wherein the rubber washer has a central bore and a projecting section converging towards the center of the washer.

11. Assembly method of a 3-in-1 fastening system for shells of mill liners used for grinding minerals allowing the quick installation and removal in one step by using conventional tools, comprising the steps of:
    providing a metal washer constituted by a core, side walls and washer bores;
    vulcanizing a rubber washer between the side walls and below the core of the metal washer with a central opening concentric to the bore of the metal washer;
    introducing one or more retaining elements through one or more inner openings of the metal washer;
    concentrically assembling a fastening element to the top inside portion of the washer so that one or more retaining elements in the metal washer is arranged between the one or more inner openings and an inner recess of the fastening element.

12. The assembly method according to claim 11, wherein the fastening element is a nut.

13. The assembly method according to claim 11, wherein the fastening element is a bolt.

* * * * *